(12) United States Patent
Fujimura et al.

(10) Patent No.: US 7,317,836 B2
(45) Date of Patent: Jan. 8, 2008

(54) POSE ESTIMATION BASED ON CRITICAL POINT ANALYSIS

(75) Inventors: Kikuo Fujimura, Palo Alto, CA (US); Youding Zhu, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 11/378,573

(22) Filed: Mar. 17, 2006

(65) Prior Publication Data

US 2006/0274947 A1 Dec. 7, 2006

Related U.S. Application Data

(60) Provisional application No. 60/663,020, filed on Mar. 17, 2005.

(51) Int. Cl.
G06K 9/00 (2006.01)
G06K 9/36 (2006.01)
G06K 9/46 (2006.01)
G06K 9/62 (2006.01)
G06K 9/66 (2006.01)

(52) U.S. Cl. ............... 382/203; 382/154; 382/190; 382/201; 382/224; 382/291

(58) Field of Classification Search ........ 382/154, 382/190, 202, 203, 224, 291
See application file for complete search history.

(56) References Cited

U.S. PATENT DOCUMENTS

| | | | |
|---|---|---|---|
| 5,426,712 A * | 6/1995 | Nakajima | 382/199 |
| 6,243,106 B1 | 6/2001 | Rehg et al. | |
| 6,301,370 B1 | 10/2001 | Steffens et al. | |
| 6,628,821 B1 | 9/2003 | Covell et al. | |
| 6,741,756 B1 | 5/2004 | Toyama et al. | |
| 2003/0169906 A1 * | 9/2003 | Gokturk et al. | 382/115 |

(Continued)

OTHER PUBLICATIONS

Li et al. ("Articulated Pose Identification with Sparse Point Features," IEEE Transaction on Systems, Man and Cybernetics—Part B: Cybernetics, vol. 34, No. 3, Jun. 2004, pp. 1412-1422).*

(Continued)

*Primary Examiner*—Matthew C. Bella
*Assistant Examiner*—Yubin Hung
(74) *Attorney, Agent, or Firm*—Fenwick & West LLP; Mark Duell

(57) ABSTRACT

Methods and systems for estimating a pose of a subject. The subject can be a human, an animal, a robot, or the like. A camera receives depth information associated with a subject, a pose estimation module to determine a pose or action of the subject from images, and an interaction module to output a response to the perceived pose or action. The pose estimation module separates portions of the image containing the subject into classified and unclassified portions. The portions can be segmented using k-means clustering. The classified portions can be known objects, such as a head and a torso, that are tracked across the images. The unclassified portions are swept across an x and y axis to identify local minimums and local maximums. The critical points are derived from the local minimums and local maximums. Potential joint sections are identified by connecting various critical points, and the joint sections having sufficient probability of corresponding to an object on the subject are selected.

21 Claims, 8 Drawing Sheets

U.S. PATENT DOCUMENTS

2003/0235334 A1* 12/2003 Okubo ................. 382/182
2004/0120581 A1*  6/2004 Ozer et al. ............. 382/173
2004/0240706 A1* 12/2004 Wallace et al. ......... 382/103
2005/0265583 A1  12/2005 Covell et al.

OTHER PUBLICATIONS

Leung et al. ("First Sight: A Human Body Outline Labeling System," IEEE Trans. Pattern Analysis and Machine Intelligence, vol. 17, No. 4, Apr. 1995, pp. 359-377).*

Thirion ("The Extremal Mesh and the Understanding of 3D surfaces," IEEE Workshops on Biomedical Image Analysis, Jun. 1994, pp. 3-12).*

Bowden, R. et al., "Reconstructing 3D Pose and Motion from a Single Camera View," Brunel University, Uxbridge, Middlesex, UK, 9th British Machine Vision Conference, ICPR '98, Vienna, Austria, 10 pages.

Chu, C. e al., "Markerless Kinematic Model and Motion Capture from Volume Sequences," Department of Computer Science, University of Southern California, Los Angeles, CA, 2003 IEEE Computer Society Conference on Computer Vision and Pattern Recognition, Proceedings, Jun. 2003, pp. II-475-II-482. vol. 2.

Drouin, S. et al., "Simultaneous Tracking and Estimation of a Skeletal Model for Monitoring Human Motion," Department of Electrical and Computer Engineering, Laval University, Sainte-Foy, QC, Canada, Vision Interface 2003, pp. 1-8.

Poppe, R., "Real-Time Pose Estimation from Monocular Image Sequences Using Silhouettes," Apr. 2004, Department of Electrical Engineering, Mathematics and Computer Science, University of Twente, the Netherlands, 8 pages.

International Search Report and Written Opinion, PCT/US06/09875, Aug. 20, 2007, 10 pages.

* cited by examiner

 
FIG. 6A  FIG. 6B
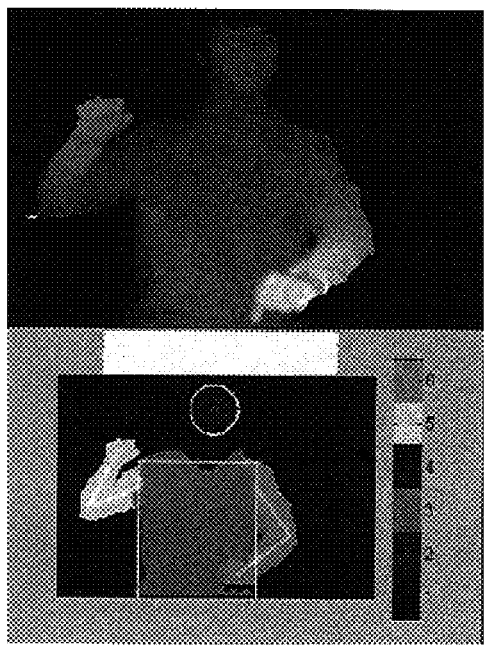 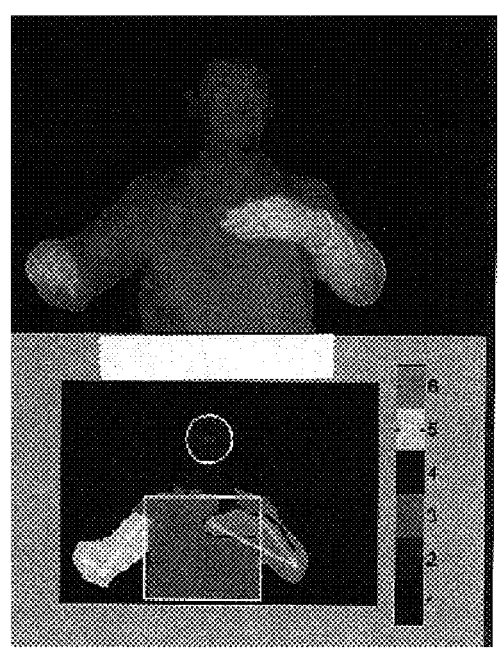
FIG. 8A  FIG. 8B

POSE ESTIMATION BASED ON CRITICAL POINT ANALYSIS

CROSS-REFERENCE TO RELATED APPLICATION

This application claims priority under 35 U.S.C. §119(e) to U.S. Provisional Patent Application No. 60/663,020, entitled "Pose Estimation Based on Critical Point Analysis," filed on Mar. 17, 2005, now abandoned the subject matter of which is incorporated by reference herein in its entirety, and to co-pending U.S. Provisional Patent Application No. 60/738,413, entitled "Estimating Pose Seciuences from Depth Image Streams," filed on Nov. 17, 2005, the subject matter of which is incorporated by reference herein in its entirety.

BACKGROUND OF THE INVENTION

1. Field of the Invention

The present invention relates to machine vision, and more specifically, to machine-based estimation of poses using critical point analysis.

2. Description of the Related Art

Conventional techniques for machine vision allow a robot or other machine to recognize objects. The objects can be recognized for navigation around the objects, retrieval of the objects, or other purposes. Conventional techniques for pose estimation detect various objects of a subject such as body parts of a human. Additionally, pose estimation can determine an orientation of the body part.

One problem with conventional techniques for pose estimation is the complexity and expense of equipment needed to capture image information. For example, a 3D camera system typically requires that the subject be confined to a room in which the cameras are configured. The 3D camera system is also very expensive. A marker system allows known points of a subject to be marked and followed throughout motions. However, the subject has to be prepared ahead of time, and be cooperative with observation.

Therefore, what is needed is a method of system for estimating poses of a subject without the expense and complexity of conventional techniques.

SUMMARY

The present invention provides methods and systems for estimating a pose of a subject based on critical point analysis. In one embodiment, a system includes a camera to receive depth information associated with a subject, a pose estimation module to determine a pose or action of the subject from images, and an interaction module to output a response to the perceived pose or action.

In one embodiment, the pose estimation module separates portions of the image containing the subject into classified and unclassified portions. The portions can be segmented using k-means clustering. The classified portions can be known objects, such as a head and a torso, that are tracked across the images. The unclassified portions are swept across an x and y axis to identify local minimums and local maximums. The critical points are derived from the local minimums and local maximums. Potential joint sections are identified by connecting various critical points, and the joint sections having sufficient probability of corresponding to an object on the subject are selected.

In another embodiment, the pose estimation module comprises an estimation module to select the joint section from the potential sections. The estimation module implements various rules to calculate probabilities associated with the potential joint sections. For example, a joint section can be evaluated for how many of its pixels are commensurate with pixels of the subject. Additional rules are discussed herein.

Advantageously, the system can take visual cues from a human to perform certain actions (e.g., go left, speed up, or stop). Furthermore, the system can observe the activities of humans, animals, robots, or other subjects for logging or other purposes.

The features and advantages described herein are not all inclusive, and, in particular, many additional features and advantages will be apparent to one skilled in the art in view of the drawings, specifications, and claims. Moreover, it should be noted that the language used in the specification has been principally selected for readability and instructional purposes and may not have been selected to circumscribe the claimed invention.

BRIEF DESCRIPTION OF THE DRAWINGS

The teachings of the present invention can be readily understood by considering the following detailed description in conjunction with the accompanying drawings. Like reference numerals are used for like elements in the accompanying drawings.

FIG. 6A is a schematic diagram showing a convention 2-D image of a human subject, while FIG. 6B shows FIG. 6A with depth information in accordance with one embodiment of the present invention.

FIG. 8A is a schematic diagram showing a depth image, while FIG. 8B shows FIG. 8A with classified and unclassified portions in accordance with one embodiment of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Figure 1:
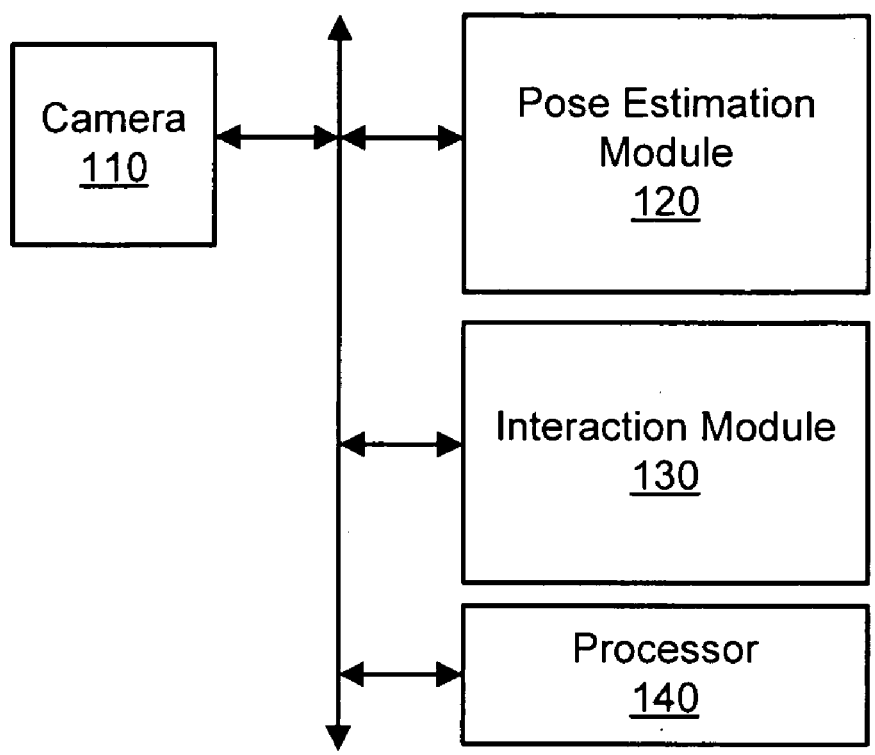
FIG. 1 is a block diagram of a system for estimating a pose of a subject according to one embodiment of the present invention.
Figure 2:
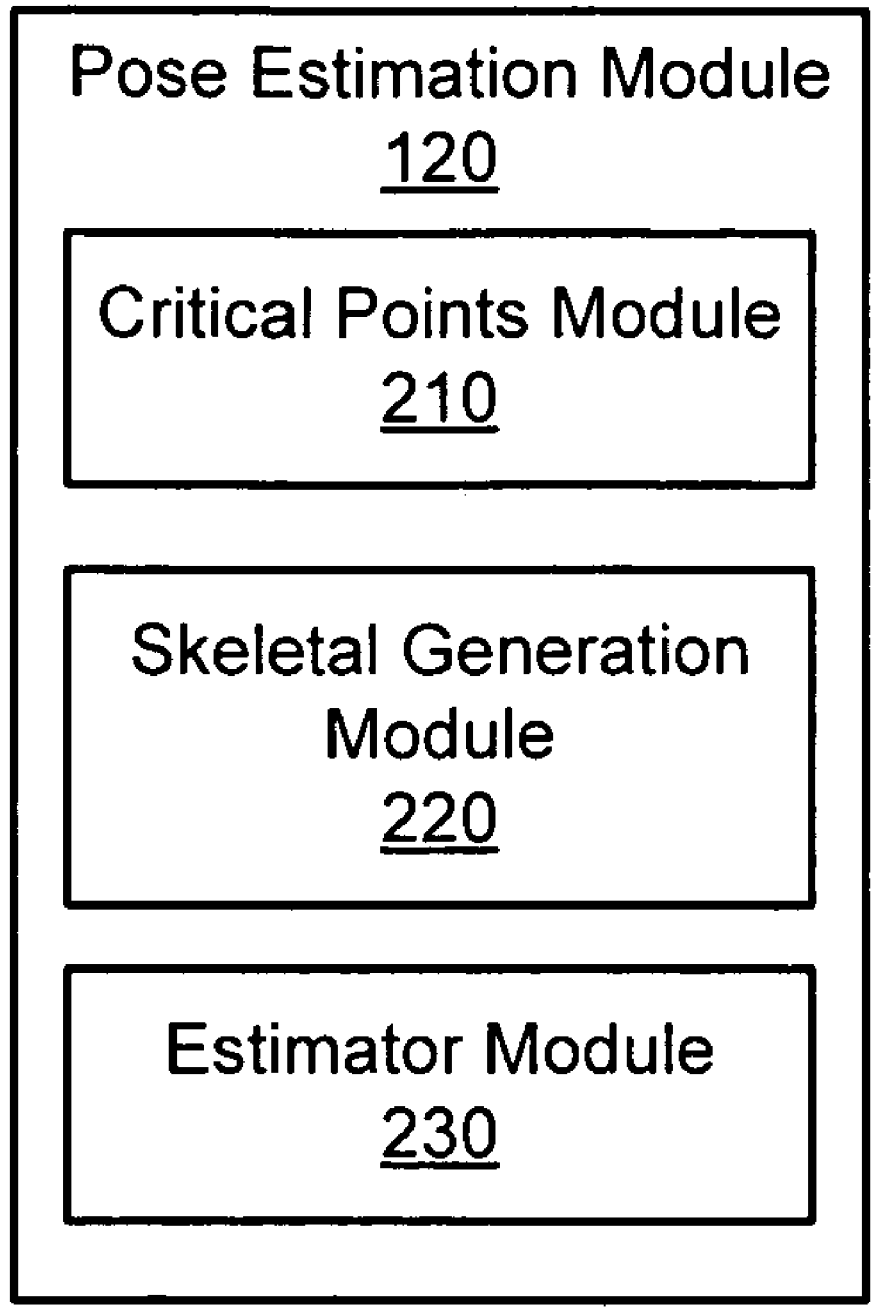
FIG. 2 is a block diagram of a pose estimation module of the system according to one embodiment of the present invention.

Methods and systems for estimating a position of a subject are described. The subject can be, for example, a human, an animal, or a robot. As the subject is in motion, or is performing various actions, the subject holds different poses over time. In one embodiment, component point analysis is employed to determine a position of the subject at a certain time. By tracking positions over time, the motion of action of the subject can be determined. For example, a robot can react to visual cues of a human such as go left, speed up, and stop. FIGS. 1 and 2 show an exemplary system implementing a method for pose estimation, and FIGS. 3-6 show an exemplary method for pose estimation. One of ordinary skill in the art will understand that, give the description herein, additional embodiments are possible.

FIG. 1 is a block diagram illustrating a system 100 for pose estimation according to one embodiment of the present invention. System 100 comprises a depth camera 110, a pose estimation module 120, an interaction module 130, and a processor 140. These components can be coupled in communication through, for example, software APIs, a data bus, an input/output controller, processor 140, and the like. System 100 can be a robot or other machine that interacts with or observes humans. Methods implemented within system 100 are described below.

Camera 110 receives image data, and sends a stream of image frames to pose estimation module 120. Camera 110 can be, for example, a pulse based camera (e.g., manufactured by 3DV Systems, Inc. of Portland, Oreg.) or a modulated light camera (e.g., manufactured by Canesta, Inc. of Sunnyvale, Calif.). In one embodiment, camera 110 captures an image of the subject including depth information. The depth information describes a distance from the camera to different portions of the subject. For example, each pixel can include a depth value in addition to traditional values such as contrast, hue, and brightness.

Pose estimation module 120 receives the stream of image frames, and sends an estimated pose to interaction module 130. Pose estimation module 120 and interaction module 130 can be implemented in hardware and/or software. One embodiment of pose estimation module 120 is described in further detail below with respect to FIG. 2. In one embodiment, pose estimation module 120 uses component point analysis to determine a pose of the subject in each of the image frames. In another embodiment, interaction module 130 tracks poses temporally across the media stream in order to determine an action of the subject. For example, a pose of a finger pointing can indicate a direction, but a finger wagging motion can indicate a degree of rotation. In response to determining an action, interaction module 130 can cause an action by system 100 such as moving in a direction, or rotating from a position.

FIG. 2 shows pose estimation module in greater detail. Pose estimation module 120 comprises a critical point module 210, skeletal generation module 220, and an estimator module 230.

Critical point module 210 can identify critical points for local minimums and maximums of the subject area. In one embodiment, critical point module 210 performs an x-sweep, or scans in both directions along the x-axis. In addition, critical point module 219 can perform a y-sweep and a z-sweep. A local minimum or maximum refers to, with respect to a particular portion of the subject, an uppermost, lowermost, leftmost, or rightmost point.

Skeletal generation module 220 can generate a skeletal structure for the subject from joint positions. In one embodiment, skeletal generation module 220 forms joint positions by connecting critical points within the subject area. Skeletal generation module 220 can implement a set of rules during the process of finding joint positions and the skeletal structure. For example, one rule can require that joint positions remain within the subject area. Another rule can require that joint positions span across the center of a local portion of the subject area. Still another rule can require that a logical human configuration is maintained. These rules are discussed in more detail below.

Figure 9:
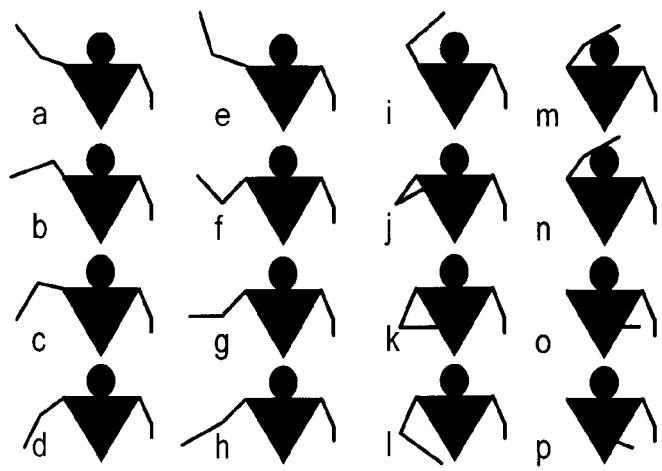
FIG. 9 is a schematic diagram of a library of preloaded poses according to one embodiment of the present invention.

Estimator module 230 can determine a pose of the subject based on the skeletal structure. In one embodiment, estimator module 230 can use posture criteria to calculate a probability that the skeletal structure matches a pose. Estimator module 230 can be preloaded with a library of poses, and library of associated skeletal structures as shown in FIG. 9.

Figure 3:
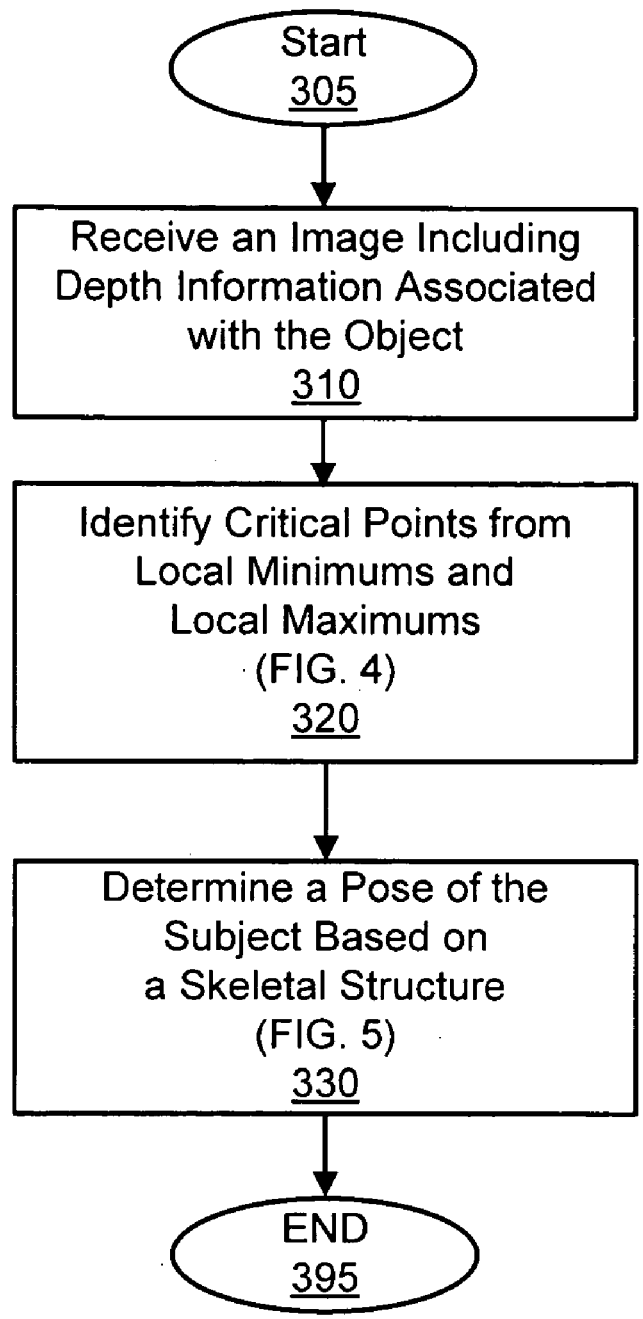
FIG. 3. is a flow chart illustrating method for estimating the pose of the subject according to one embodiment of the present invention.

FIG. 3 is a flow chart illustrating a method 300 estimating a pose of a subject according to one embodiment of the present invention. The method 300 can be implemented in a computer system (e.g., system 100)

A camera (e.g., camera 110) receives 310 an image, including depth information associated with the subject. The depth information provides a distance between the camera and portions of the subject (e.g., with respect to each pixel or group of pixels). The depth information allows the image to be segregated based not only on horizontal and vertical axes, but also based on a depth axes. To illustrate depth information, FIG. 6A shows a figure of a human subject while FIG. 6B shows FIG. 6A with depth information. A pulse-based camera sends out a pulse of illumination which echoes off object, and measures an echo. A modulated light camera emits light in a sin wave, and measures an amplitude and phase shift of the returned wave.

Figure 4:
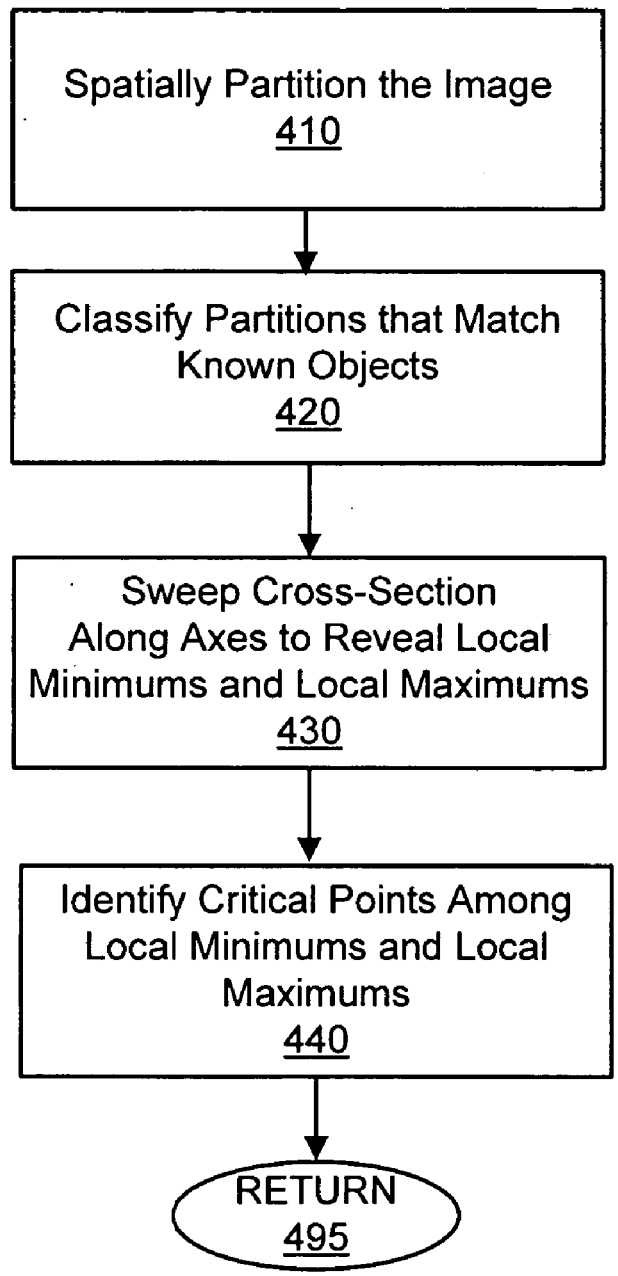
FIG. 4 is a flow chart illustrating a method for identifying critical points according to one embodiment of the present invention.
Figure 7:
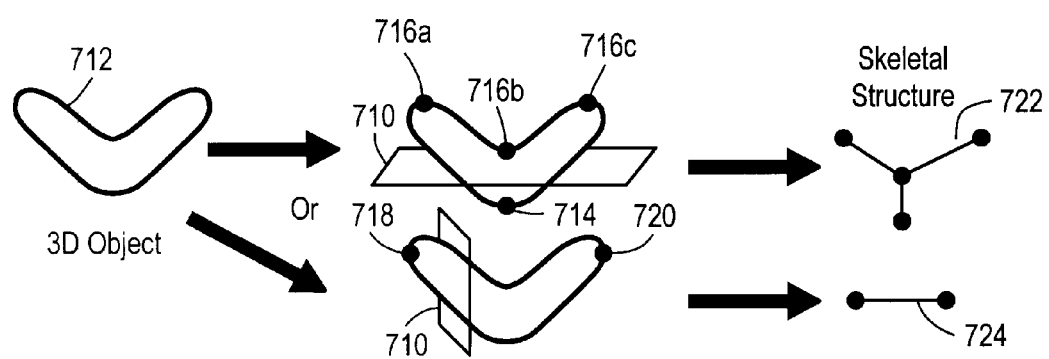
FIG. 7 is a schematic diagram of horizontal and vertical sweeps according to one embodiment of the present invention.

A critical points module (e.g., critical points module 120) identifies 320 critical points from local minimums and local maximums as shown in FIG. 4. An image is spatially partitioned 410 using, for example, k-means clustering. In some cases, neighboring clusters can be combined. Resulting partitions are classified 420 if possible. A partition is classified by identifying the partition as a known object, such as a head or torso when the subject is a human. In one embodiment, once an object is classified, it can be tracked across subsequent image for efficiency. The critical points module applies critical point analysis to the unclassified partition of the subject. More specifically, the critical points module sweeps 430 a cross-section along the axes. The local minimums and local maximums revealed in the sweeps form the critical points 540. For example, as shown in FIG. 7, a cross-section 710 that is swept vertically across a 3D object 712 reveals local minimum 714, and local maximums 716a-c. Furthermore, when cross-section 710 is swept horizontally across 3D object 712, local minimum 718 and local maximum 720 are revealed.

Figure 5:
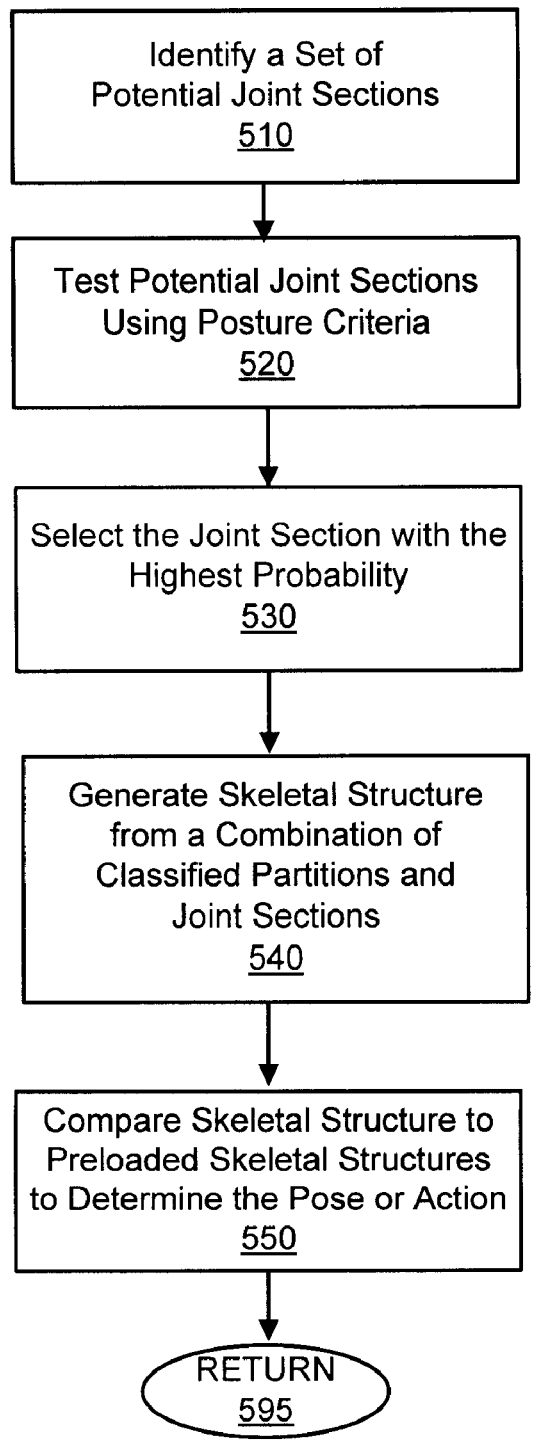
FIG. 5 is a flow chart illustrating a method for generating a skeletal structure according to one embodiment of the present invention.
Figure 10:
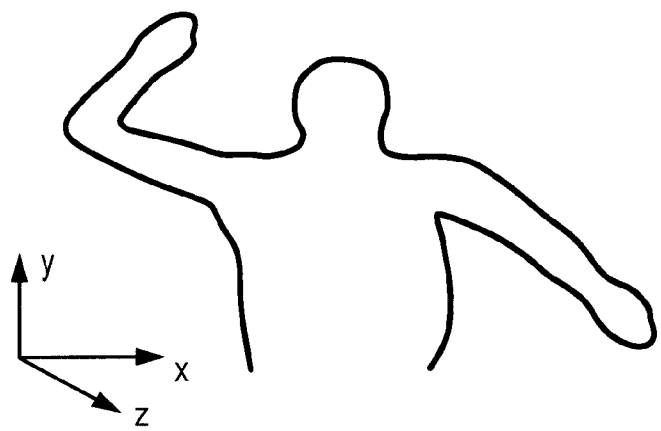
FIG. 10 is a schematic diagram of a subject in an image and axes used for sweeping the subject for local minimums and local maximums according to one embodiment of the present invention.
Figure 11:
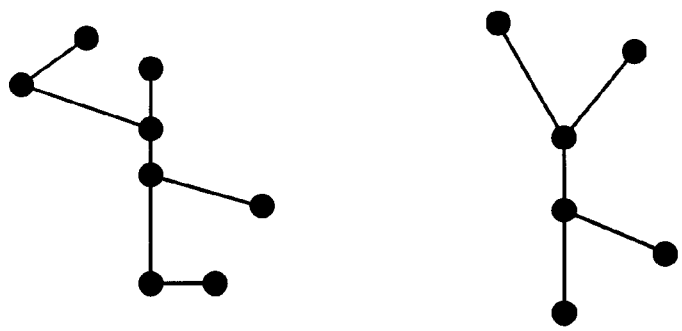
FIG. 11 is a schematic diagram of a skeletal structure generated from the subject image of FIG. 10 according to one embodiment of the present invention.

Referring again to FIG. 3, the skeletal generation module (e.g., skeletal generation module 130) determines 330 a pose of the subject based on the skeletal structure as shown in FIG. 5. A set of potential joint sections are identified 510 by connecting selected critical points. The potential joint sections are tested using, for example, the posture criteria 520. The posture criteria represents a probability that the joint section is associated with an actual object on the subject. The joint section having the highest probability is selected 530. The classified portions of the subject area and joint sections in unclassified portions of the subject area are combined 540 to form the skeletal structure. The skeletal structure is compared 6550 to preloaded skeletal structures to determine the pose. Returning to FIG. 7, skeletal structure 722 is a result of the vertical scan, and skeletal structure 724 is a result of the horizontal scan, both of which identified joint sections from critical points. In addition, FIG. 11 is a skeletal structure resulting from a subject shown in FIG. 10.

The posture criteria can be calculated using the following formula:

$$P(h)=F1(h)F2(h)F3(h)F4(h)F5(h)$$

where Fi corresponds to the i-th constraint defined in the posture criteria. In other words, each rule can be represented as a probability between 0 and 1. A product of the probability is used to compare the potential joint sections. The rules can be expressed by the following formulas:

$$F_1(h)=\lambda e^{-\lambda x}$$

where F1 represents the amount of pixel that are outside of the blob;

$$F_2(h) = \prod_{i=1}^{N} \frac{1}{\sqrt{2\pi}\,\sigma_1} e^{-\frac{s_i^2}{2\sigma_1^2}}$$

where F2(h) represents how close the joint section is to the local center, or the center of the partition;

$$F_3(h) = \prod_{i=1}^{M} \frac{1}{\sqrt{2\pi}\,\sigma_2} e^{-\frac{f_i^2}{2\sigma_2^2}}$$

where F3(h) represents how close the critical points are to the joint section;

$$F_4(h) = \frac{1}{\sqrt{2\pi}\,\sigma_3} e^{\frac{(\min(DT\_Hand-DT\_Elbrow,0))^2}{2\sigma_2^2}}$$

where F4(h) ensures a proper sequence of joint segments (e.g., that a hand connects to an arm, and that a hand does not connect to a foot);

$$F_5(h) = \frac{1}{\sqrt{2\pi}\,\sigma_4} e^{\frac{(Hand^{t-1}-Hand^t)^2+(Elbow^{t-1}-Elbow^t)^2}{2\sigma_4^2}}$$

where F5(h) ensures that temporal continuity is preserved between images. Furthermore, x is the number of points located within the subject area being analyzed (e.g., an arm); s is the distance of a sampled skeleton point to the subject area; f is the distance of a critical point to the subject area; DT_Hand is the distance transformed value of a point (e.g., on a hand); DT_Elbow is the distance transformed value of another point (e.g., on an elbow); Hand is the hand point and Elbow is the elbow point in this example; $\lambda$ is a Poisson distribution parameter; and $\sigma$ is a Gaussian distribution parameter. Note that alternative formulations of posture criteria are possible.

Referring again to FIG. 3, an interaction module (e.g., interaction module 130) responds to the estimated pose. In one embodiment, the estimated poses can be considered temporally to determine an action. The interaction module can output an action that is responsive to the estimated pose of the action.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for estimating a pose of a subject in an image, comprising:
   receiving the image including depth information associated with the subject;
   classifying one or more parts of the image as known parts of the subject;
   identifying critical points representing local horizontal minimums, local horizontal maximums, local vertical minimums, and local vertical maximums of unclassified parts of the image from the depth information;
   generating a skeletal structure for the subject from joint positions, the joint positions formed by connecting critical points within an the unclassified parts of the image; and
   determining a pose of the subject based on the skeletal structure.

2. The method of claim 1, wherein the step of generating the skeletal structure comprises:
   determining a set of possible joint positions by identifying pairs of critical points that, when connected, remain within the unclassified parts of the image.

3. The method of claim 1, wherein the step of generating the skeletal structure comprises:
   determining a set of possible joint positions by identifying pairs of critical points that, when connected, span closest to a center of the unclassified parts of the image.

4. The method of claim 1, wherein the step of generating the skeletal structure comprises:
   determining a set of possible joint positions by identifying pairs of critical points that, when connected, preserve a known human configuration.

5. The method of claim 1, wherein the step of generating the skeletal structure comprises:
   receiving a subsequent image; and
   determining a set of possible joint positions by identifying pairs of critical points that, when connected, preserve continuity between the images.

6. The method of claim 1, further comprising:
   spatially partitioning the image with k-means clustering, wherein the local minimums and maximums correspond to minimums and maximums within spatial partitions.

7. The method of claim 1, wherein the step of generating the skeletal structure comprises:
   receiving a subsequent image;
   identifying subsequent critical points; and
   generating a subsequent skeletal image by comparing the critical points against the subsequent critical points.

8. A computer-readable medium storing a computer program product configured to perform a method for estimating a pose of a subject in an image, the method comprising:
   receiving the image including depth information associated with the subject;
   classifying one or more parts of the image as known parts of the subject; identifying critical points representing local horizontal minimums, local horizontal maximums, local vertical minimums, and local vertical maximums of unclassified parts of the image from the depth information;
   generating a skeletal structure for the subject from joint positions, the joint positions formed by connecting critical points within the unclassified parts of the image; and
   determining a pose of the subject based on the skeletal structure.

9. The computer program product of claim 8, wherein the step of generating the skeletal structure comprises:
   determining a set of possible joint positions by identifying pairs of critical points that, when connected, remain within the unclassified parts of the image.

10. The computer program product of claim 8, wherein the step of generating the skeletal structure comprises:
   determining a set of possible joint positions by identifying pairs of critical points that, when connected, span closest to a center of the unclassified parts of the image.

11. The computer program product of claim 8, wherein the step of generating the skeletal structure comprises:
   determining a set of possible joint positions by identifying pairs of critical points that, when connected, preserve a known human configuration.

12. The computer program product of claim 8, wherein the step of generating the skeletal structure comprises:
   receiving a subsequent image; and determining a set of possible joint positions by identifying pairs of critical points that, when connected, preserve continuity between the images.

13. The computer program product of claim 8, further composing:
spatially partitioning the unclassified parts of the image with k-means clustering,
wherein the local minimums and maximums correspond to minimums and maximums within spatial partitions.

14. The computer program product of claim 8, wherein the step of generating the skeletal structure comprises:
receiving a subsequent image;
identifying subsequent critical points; and
generating a subsequent skeletal image by comparing the critical points against the subsequent critical points.

15. A system for estimating a pose of a subject in an image, comprising:;
an input to receive the image including depth information associated with the subject;
a critical points module, coupled in communication with the input, the critical points module configured to classify one or more parts of the image as known parts of the subject and identify critical points representing local horizontal minimums, local horizontal maximums, local vertical minimums, and local vertical maximums of unclassified parts of the image from the depth information;
a skeletal generation module, coupled in communication with the critical points module, the skeletal generation module configured to form a skeletal structure for the subject from joint positions, the joint positions formed by connecting critical points within the unclassified parts of the image; and
an estimation module, coupled in communication with the skeletal generation module, the estimation module configured to determine a pose of the subject based on the skeletal structure.

16. The system of claim 15, wherein the skeletal generation module determines a set of possible joint positions by identifying pairs of critical points that, when connected, remain within the unclassified parts of the image.

17. The system of claim 15, wherein the skeletal generation module determines a set of possible joint positions by identifying pairs of critical points that, when connected, span closest to a center of the unclassified parts of the image.

18. The system of claim 15, wherein the skeletal generation module determines a set of possible joint positions by identifying pairs of critical points that, when connected, preserve a known human configuration.

19. The system of claim 15, wherein the input receives a subsequent image, and the skeletal generation module determines a set of possible joint positions by identifying pairs of critical points that, when connected, preserve continuity between the images.

20. The system of claim 15, wherein the critical points module spatially partitions the image with k-means clustering, wherein the local minimums and maximums correspond to minimums and maximums within spatial partitions.

21. The system of claim 15, wherein the input receives a subsequent image, the critical points module identifies subsequent critical points, and the skeletal generation module generates a subsequent skeletal image by comparing the critical points against the subsequent critical point.

* * * * *